March 16, 1954
R. F. OTT
2,672,350
TRAILER VEHICLE CONSTRUCTION
Filed Jan. 28, 1953
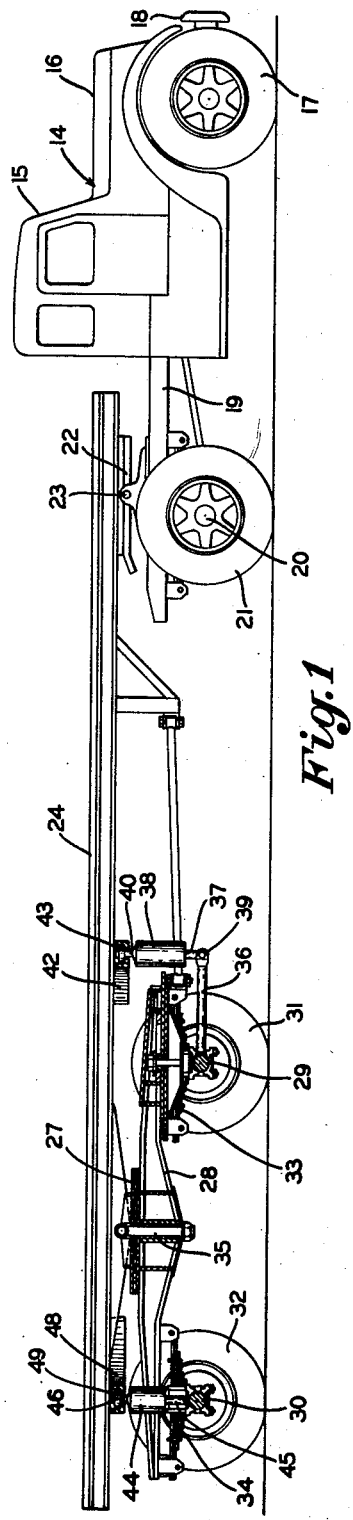
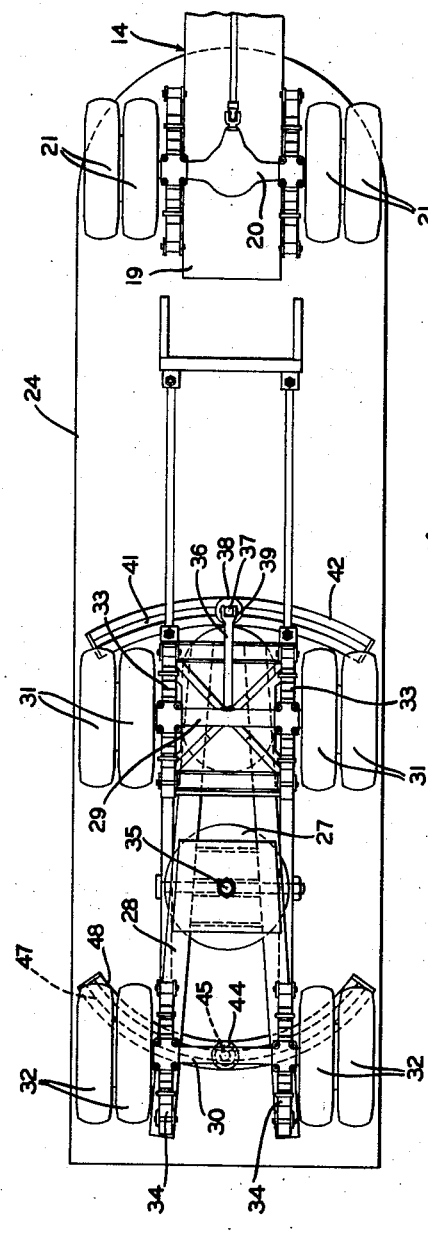
INVENTOR.
*Richard F. Ott*
BY
*Frease & Bishop*
ATTORNEYS Patented Mar. 16, 1954

2,672,350

UNITED STATES PATENT OFFICE 2,672,350

TRAILER VEHICLE CONSTRUCTION

Richard F. Ott, Canton, Ohio

Application January 28, 1953, Serial No. 333,697

4 Claims. (Cl. 280—81)

The invention relates to highway vehicles for transporting heavy loads, and more particularly to a tractor and trailer combination of the general type shown in U. S. Letters Patent No. 2,373,398, issued April 10, 1945 to Ernest S. Hoobler, and U. S. Letters Patent No. 2,466,194, issued April 5, 1949 to Anderson and Riemenschneider.

The general type of trailer construction referred to includes a load carrying platform having its front end supported on the fifth wheel of a tractor and its rear end provided with a fifth wheel supported on a two-axle undercarriage, at a point between the axles.

With this construction, the allowable gross load for the semi-trailer, in certain states, is 18,000 pounds for the rear axle of the tractor and 32,000 pounds for the two tandem-connected rear axles of the trailer, for a total of 50,000 pounds.

The present invention has for its object the provision of means for directly connecting both of the tandem-connected rear axles of the trailer to the trailer platform so as to comply with certain State laws, to permit an allowable gross load of 18,000 pounds for each of the rear axles of the trailer or a total of 36,000 pounds for the two rear axles, or a total of 54,000 pounds for the three axles, as compared with a total of 50,000 pounds.

Another object is to provide a direct connection between each of the rear axles of the trailer and the trailer platform, which permits turning movement of the undercarriage supported upon the tandem wheels, relative to the trailer platform.

A further object is to provide such a trailer construction in which a shock absorbing device, in the form of a fluid cylinder or the like, is carried by each of the tandem-connected axles and operatively connected to an arcuate track upon the underside of the trailer platform.

A still further object is to provide a trailer construction of this character having means for eliminating whip in the trailer platform.

The above objects together with others which will be apparent from the drawing and following description, or which may be later referred to, may be attained by providing a trailer vehicle construction of the type hereinafter described in detail and illustrated in the accompanying drawings, in which:

Fig. 1 is a side elevation of the improved trailer vehicle construction with parts broken away for the purpose of illustration; and Fig. 2 a bottom plan view thereof.

While the invention is illustrated as embodied in the undercarriage of a trailer vehicle, it should be understood that it may be applied to the undercarriage of an automotive vehicle such as a truck or the like, having a self container power unit.

Referring now more particularly to the embodiment of the invention illustrated in the accompanying drawing, in which similar numerals refer to similar parts throughout, a conventional automotive tractor is indicated generally at 14 and comprises the usual cab 15, motor hood 16, front wheels 17 and bumper 18.

The frame 19 of the tractor is supported at its rear end upon the rear axle 20 and wheels 21, and the frame 19 is provided with the usual fifth wheel 22 adapted to rock upon its horizontal axis 23 in conventional manner.

The trailer platform 24 is provided with the usual king pin adapted to enter the usual guideway of the fifth wheel 22 so as to form a vertical pivot about which the trailer platform 24 may swing horizontally relative to the tractor.

Both the tractor 14 and fifth wheel connection thereof with the trailer platform are of conventional and well known construction and in themselves form no part of the present invention.

The trailer platform 24 is supported at its rear end by means of a fifth wheel connection, indicated generally at 27, on the frame 28 of an undercarriage carried on the front and rear axles 29 and 30 respectively, which are shown as provided with the dual wheels 31 and 32 respectively.

The frame 28 is resiliently supported on the axles by means of leaf springs 33 and 34, and the fifth wheel 27 is supported on the frame 28 of the undercarriage at a point between the axles 29 and 30. A bolt or pivot pin 35 extends vertically through the fifth wheel 27 and forms a pivot about which the frame 28 can swing horizontally.

All of the above described parts are more or less conventional in trailer vehicle construction of the general character referred to. With such a construction the laws of certain States allow a gross load of 18,000 pounds for the axle 20 and 32,000 pounds for the combined axles 29 and 30, or a total of 50,000 pounds for the vehicle as above described.

The present invention consists in an attachment to such a vehicle whereby each of the axles 29 and 30 is directly connected to the trailer platform 24 in order that in such States the allowable gross load of the vehicle will be 18,000 pounds for each of the three axles or a total of 54,000 pounds.

The front axle 29 of the undercarriage 28 is directly connected to the trailer platform 24 by means of a rigid arm 36 fixed to the axle 29 and extending forwardly therefrom in a horizontal direction and being connected to the plunger rod 37 of a shock absorber device such as the fluid cylinder 38.

If desired, the connection between the rigid arm 36 and the plunger rod 37 may be in the form of a knuckle, as indicated at 39. A rigid stub shaft 40 is fixed to the upper end of the cylinder 38 and is slidably engaged in the arcuate slot 41 of the curved track 42, being preferably provided with a roller 43 or the like. The track 42 is connected to the underside of the trailer platform 24 and is located in an arc of a circle, the center of which coincides with the pivot pin 35.

A cylinder 44, similar to the cylinder 38, is rigidly mounted above the axle 30 by means of the rigid arm 45 fixed to said axle. A stub shaft 46 is fixed upon the upper end of the cylinder 44 and engages in the arcuate slot 47 in the track 48 which is also located in an arc of a circle drawn around the pivot pin 35. If desired, a roller 49 or the like may be provided upon the stub shaft 46 for engagement in the track 48.

With this construction both axles 29 and 30 are directly connected to the trailer platform 24, the connections permitting horizontal turning movement of the frame 28 around the pivot pin 35 without breaking the connections, the rollers 43 and 49 carried by the cylinders 38 and 45 riding in the arcuate tracks 42 and 48 respectively.

The improved construction illustrated and described not only provides a direct connection between each of the axles 29 and 30 and the trailer platform, so as to permit a greater allowable load thereon, but the fluid cylinders 38 and 44 will also serve to prevent undue whipping of the trailer platform relative to the undercarriage.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful constructions, and reasonable mechanical equivalents thereof obvious to those skilled in the art, are set forth in the appended claims.

I claim:

1. A vehicle construction including a load carrying platform, an undercarriage located under the rear portion of said platform, a fifth wheel connection between an intermediate portion of the undercarriage and the platform, axles at the forward and rear ends of the undercarriage, wheels upon the axles supporting the undercarriage, fluid cylinders having plungers connected to the axles, arcuate tracks mounted upon the underside of the platform, and means upon the cylinders engaged in said tracks.

2. A vehicle construction including a load carrying platform, an undercarriage located under the rear portion of said platform, a fifth wheel connection between an intermediate portion of the undercarriage and the platform, axles at the forward and rear ends of the undercarriage, wheels upon the axles supporting the undercarriage, fluid cylinders having plungers connected to the axles, arcuate tracks mounted upon the underside of the platform, and rollers upon the cylinders engaged in said tracks.

3. A vehicle construction including a load carrying platform, an undercarriage located under the rear portion of said platform, a fifth wheel connection between an intermediate portion of the undercarriage and the platform, axles at the forward and rear ends of the undercarriage, a turntable between one of said axles and the undercarriage, wheels upon the axles supporting the undercarriage, fluid cylinders having plungers connected to the axles, arcuate tracks mounted upon the underside of the platform, and means upon the cylinders engaged in said tracks.

4. A vehicle construction including a load carrying platform, an undercarriage located under the rear portion of said platform, a pivotal connection between an intermediate portion of the undercarriage and the platform, axles at the forward and rear ends of the undercarriage, wheels upon the axles supporting the undercarriage, a turntable between one of the axles and the undercarriage, an arcuate track mounted upon the underside of the platform adjacent to said one axle, a fluid cylinder having a plunger connected to said one axle, means upon said fluid cylinder engaged in said arcuate track, a second fluid cylinder having a plunger connected to the other axle, and means connecting said second named fluid cylnider to the platform.

RICHARD F. OTT.

References Cited in the file of this patent

UNITED STATES PATENTS

| Number | Name | Date |
|---|---|---|
| 847,067 | Harmon | Mar. 12, 1907 |
| 1,127,063 | Miller | Feb. 2, 1915 |
| 2,373,398 | Hoobler | Apr. 10, 1945 |
| 2,395,640 | Pearson | Feb. 26, 1946 |
| 2,466,194 | Anderson et al. | Apr. 5, 1949 |
| 2,631,043 | Shaffer | Mar. 10, 1953 |